Figure 1:
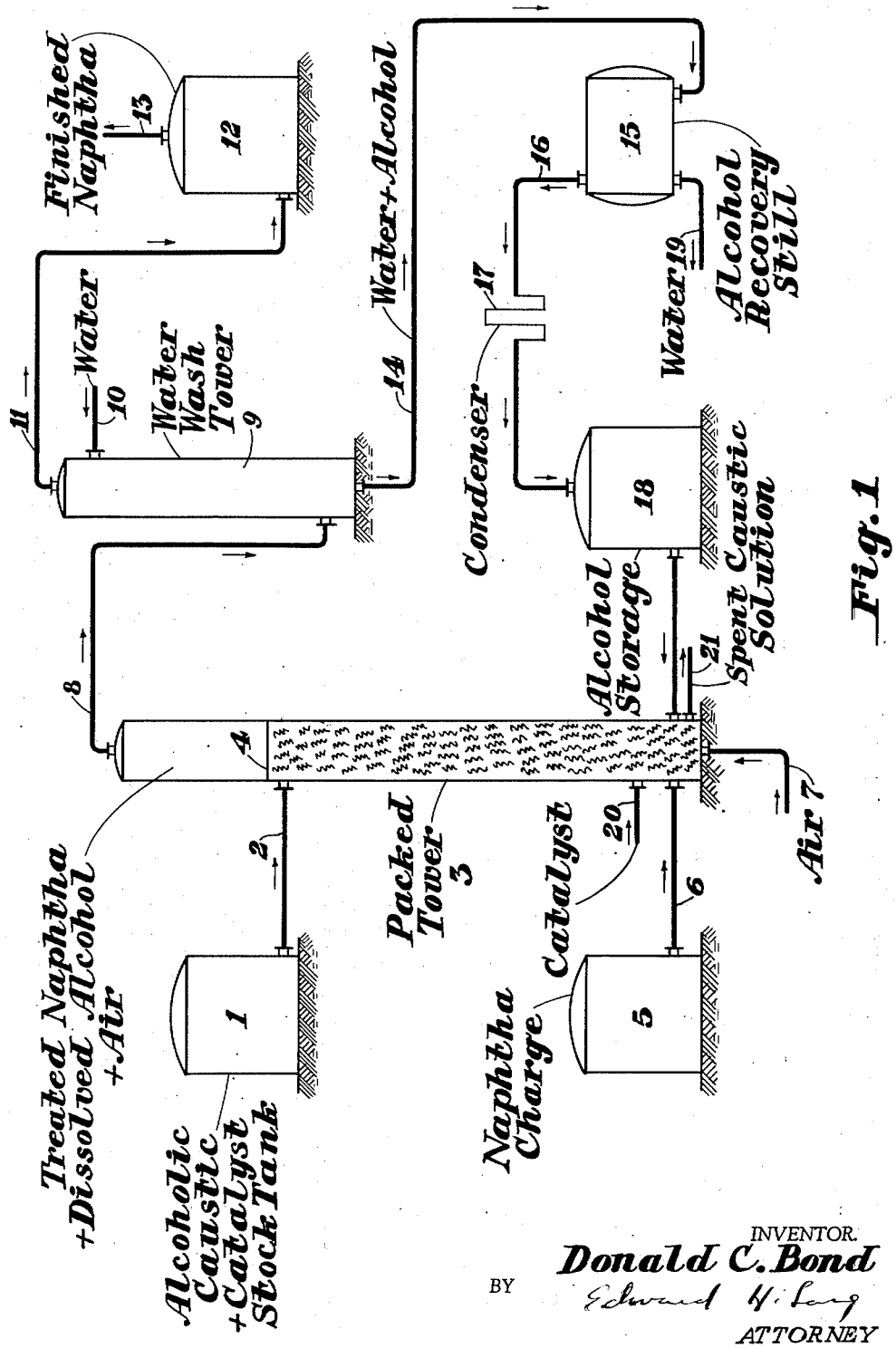

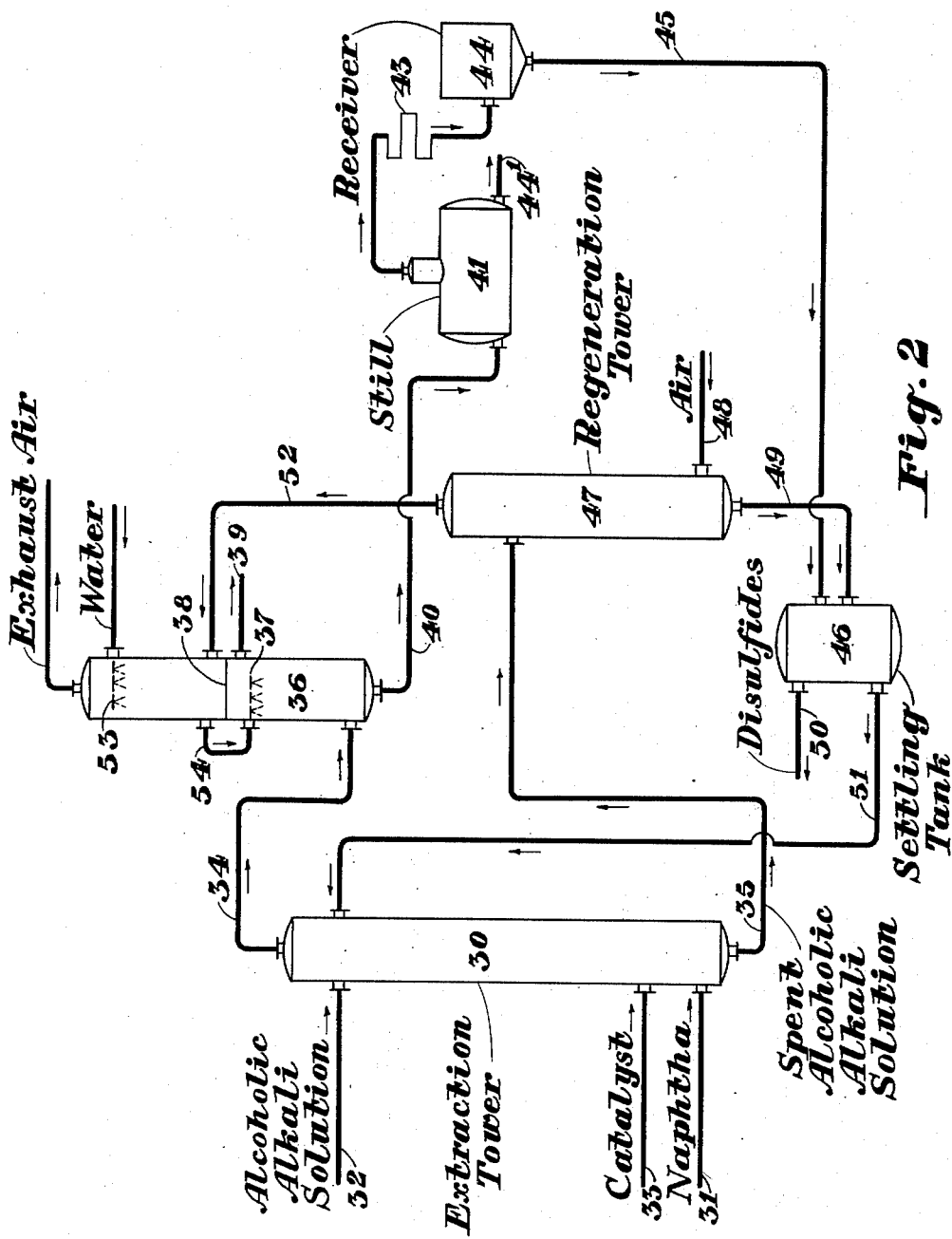

Patented Dec. 26, 1950

2,535,833

UNITED STATES PATENT OFFICE 2,535,833

CATALYTIC OXIDATION OF MERCAPTANS

Donald C. Bond, Northbrook, Ill., assignor to The Pure Oil Company, Chicago, Ill., a corporation of Ohio Application April 25, 1946, Serial No. 664,821

3 Claims. (Cl. 196—29)

This invention relates to a method for removing acidic or mal-odorous sulfur compounds from hydrocarbon fluids and to a method for converting such compounds to sulfur compounds of unobjectionable odor.

The removal of acidic sulfur compounds, such as mercaptans, from hydrocarbon oils by extraction with caustic alkali-methanol solution and regeneration of the resulting solution is disclosed in the patent to Yabroff, No. 2,152,721. The sweetening of hydrocarbon oils by contact with alcoholic alkali solution in the presence of hydrogen peroxide is disclosed in the patent to Wilson, No. 2,181,037.

I have discovered that sweetening of hydrocarbon oils in the presence of alcoholic alkali solution can be readily effected by means of air oxidation if there is present in the alkali solution a small amount of a phenolic oxidation catalyst. I have also found that the air regeneration of alcoholic alkali solutions used to extract mercaptans and other acidic sulfur compounds from hydrocarbon fluid is greatly accelerated if a small amount of phenolic oxidation catalyst is present in the alkali solution. The phenolic oxidation catalysts which are used in accordance with my invention are aromatic compounds having one or more hydroxyl groups attached to an aromatic ring and which are oxidizable to the quinone form. The catalyst must be soluble in an effective amount in the alcoholic alkali solution. As compounds which are effective at catalysts may be mentioned, pyrogallol, hydroquinone, normal butyro pyrogallol, anthragallol, gallic acid, tannic acid, 3-4-dihydroxy diphenyl, 2-5-dihydroxy diphenyl, butyl pyrogallol and mono methyl ether of pyrogallol. Substances which contain phenolic compounds of the type above pointed out are useful as catalysts. As examples of such compounds may be mentioned tannin and high-boiling hard wood tar. As examples of hard wood tar which are particularly effective are U. O. P. Inhibitor No. 1 and I Tar Oil. U. O. P. Inhibitor No. 1 is the commercial designation of a product sold by the Universal Oil Products Company as a gasoline anti-oxidant. It is a hard wood tar fraction boiling between 240° and 300° C. I Tar Oil is a settled hard wood tar sold by the Tennessee Products Company. For the method for producing the settled tars, reference should be had to the article entitled "New Products from Wood Carbonization" by A. W. Goos and A. A. Reiter of the Cliffs Dow Chemical Company, Marquette, Michigan, which appeared in the February, 1946 issue of The Journal of Industrial and Engineering Chemistry, pages 132 to 135, inclusive. The catalysts are effective when present in the alcoholic alkali solution in amounts of approximately 0.1 to 3% by weight, although we prefer to use an amount equivalent to 1% by weight.

In accordance with my invention the alkali solution may be a solution of potassium and/or sodium hydroxide in methyl and/or ethyl alcohol, preferably with sufficient water present to prevent any substantial amount of alcohol from dissolving in the hydrocarbon undergoing treatment. I have found that the treating solution may contain up to approximately 25% of water without materially affecting the efficiency of the treating or regenerating operation. When water is present in the treating solution in amounts above 40%, a noticeable decrease in the rate of oxidation of mercaptans or other acidic sulfur compounds occurs. Where methyl alcohol is used it may be used in substantially anhydrous form, whereas, when using ethyl alcohol, water is preferably present in an amount of not less than 5% to prevent solution of large amounts of alcohol in the hydrocarbon liquid. The amount of alkali in the solution may vary from approximately 5% by weight to an amount sufficient to saturate the solution, although I prefer to use solutions containing between 10 and 25% by weight of caustic alkali. Treatment in accordance with my invention is effected under ordinary atmospheric temperatures. Oxidation proceeds more rapidly at higher temperatures than at lower temperatures, but treating-temperatures above approximately 130° F. should be avoided in order to obviate the possibility of undesirable oxidation occurring.

The invention will be more readily understood by reference to the accompanying drawings of which Figure 1 is a diagrammatic, elevational view of an apparatus illustrating a method of sweetening hydrocarbon liquid in accordance with my invention, and Figure 2 is a diagrammatic, elevational view of an apparatus useful in removing acidic sulfur compounds from hydrocarbon fluid in accordance with my invention.

Referring particularly to Figure 1, numeral 1 indicates a storage tank for holding alcoholic caustic alkali solution for use in the process. The solution will have dissolved therein approximately 1% by weight of a phenolic oxidation catalyst such as U. O. P. Inhibitor No. 1 or I Tar Oil. Sufficient solution is permitted to flow through line 2 into packed tower 3 to fill the tower to the level indicated by line 4. Naphtha is charged from tank 5 through line 6 into the bottom of tower 3. Air is bubbled into the bottom of the tower 3 through line 7. The mercaptans in the naphtha are oxidized to disulfides by the air in the presence of the alcoholic alkali solution containing the catalyst. The sweetened naphtha containing disulfides passes over from the top of the tower 3 through line 8 to the lower portion of a wash tower 9. The spent air also passes from tower 3 through line 8 into wash tower 9. Water is admitted to the top of the wash tower through line 10 in order to wash dissolved alcohol from the naphtha. About 1 to 5% by volume of water, based on the naphtha is sufficient to remove any alcohol contained in solution in the naphtha. The washed naphtha and spent air pass from the top of the tower 9 through line 11 into finished naphtha tank 12. Spent air escapes from the tank 12 through line 13 and may be further washed with an absorbent such as gas oil or kerosene, if necessary, to remove any hydrocarbon vapors which may be contained therein.

Wash-water leaves the bottom of wash tower 9 through line 14 and passes to an alcohol recovery still 15. Alcohol is taken overhead from the still 15 through line 16, condensed in condenser 17 and stored in tank 18. Water leaves the bottom of still 15 through line 19. The water leaving still 15 may be used as wash water for charging through line 10. Alcohol from the tank 18 is recycled back to the bottom of tower 3.

Make-up alcoholic caustic alkali solution may be added to the tower 3 from time to time through line 2. Catalyst may be added to the tower from time to time as found necessary through line 20. A withdrawal line 21 is provided at the bottom of the tower 3 in order to withdraw alcoholic alkali solution from time to time as it becomes spent.

The amount of air fed to the tower 3 through line 7 is regulated so as to allow sufficient air to sweeten the naphtha, but care should be exercised not to bubble air through the tower at such rate or in such amount as to carry excessive quantities of alcohol and hydrocarbon vapors in the spent air.

Referring now to Figure 2, numeral 30 indicates a packed tower into the bottom of which is fed naphtha or other hydrocarbon fluid to be treated through line 31 and to the top of which is fed alcoholic caustic alkali solution through line 32. Line 33 is also provided adjacent the bottom of the tower through which is fed catalyst as required. Treated naphtha leaves the top of the tower through line 34 and spent alcoholic alkali solution leaves the bottom of the tower through line 35. The naphtha passes from line 34 to the bottom of tower 36 where it is washed with a stream of water which enters the top of the bottom section of the tower through the spray head 37. The tower 36 is divided into two sections by the imperforate plate 38. Washed naphtha leaves the top of the bottom section of tower 36 through line 39 and passes to storage. The wash-water containing alcohol washed from the naphtha, leaves the bottom of tower 36 through line 40 and passes to alcohol recovery still 41. Alcohol vapors leave the top of the still 41, pass through condenser 43 and then to receiver 44. Water is withdrawn from the bottom of the still through line 44$^1$. From the receiver 44 alcohol is returned through line 45 to settling tank 46.

The spent alcoholic alkali solution leaving the extraction tower 30 through line 35 passes to the upper portion of a packed regeneration tower 47. Air is bubbled into the lower portion of the tower 47 through line 48. The mixture of regenerated alcoholic alkali solution and disulfides leaves the bottom of tower 47 through line 49 and passes to the settling tank 46 in order to permit the disulfides to settle from the alcoholic alkali solution. The disulfides are withdrawn from the top of settling tank 46 through line 50. The regenerated alcoholic alkali solution together with the alcohol returned from receiver 44 is recycled through line 51 to the upper portion of extraction tower 30.

Spent air leaves the top of the regenerating tower 47 through line 52 and passes to the lower portion of the upper section of the water-wash tower 36. Water is sprayed into the upper portion of the upper section of wash-tower 36 through spray-head 53. In this washing operation hydrocarbon vapors and alcohol contained in the spent air are washed therefrom. The wash-water from the upper section of tower 36 passes through line 54 to the spray-head 37 in the lower section of the tower. Where the hydrocarbon undergoing treatment is a relatively high-boiling material, such as naphtha or kerosene, the washing of the spent air in the upper section of tower 36 may be dispensed with. Instead of water, a hydrocarbon absorbent such as gas oil or kerosene may be used to wash the air in the upper section of the tower. In that case the absorbent will be withdrawn through a line (not shown) in the bottom of the upper section of the tower and water fed into the upper portion of the lower section. The water leaving still 41 through line 44$^1$ may be used as wash water in either or both sections of tower 36.

The volume ratio of treating solution to hydrocarbon fluid treated may vary from about 1 to 20 to about 1 to 2. With an efficient contact tower a volume of treating solution equal to about 5 to 10% by volume of the hydrocarbon fluid is sufficient to remove substantially all acidic sulfur compounds from the fluid.

In the regeneration step sufficient air or other free oxygen-containing gas is bubbled through the used alkali solution to reduce the acidic sulfur content to a point low enough to enable the solution to extract further quantities of acidic sulfur compounds such as mercaptans from the hydrocarbon fluid undergoing treatment, but the amount of air must be limited so that the catalyst is not destroyed by overoxidation or does not exist in the oxidized form at the time the regenerated solution is recontacted with the hydrocarbon fluid. In order to accomplish these purposes, sufficient air or oxidizing gas is used to reduce the acidic sulfur content of the regenerated alcoholic alkali solution to not less than about .05% by weight and not more than about 0.6% and preferably not more than 0.2% by weight. By permitting the solution after regeneration to stand for a sufficient period of time to reach equilibrium (about 15 to 30 minutes) the solution can be reused without risk of oxidizing mercaptans in situ to any substantial extent, provided a small amount of mercaptan sulfur is still present in the solution.

The rate at which air is bubbled through the used alkali solution should be regulated so as not to carry off excessive amounts of alcohol in the spent air.

An amount of water equal to about 1 to 5% by volume of the naphtha is sufficient to effectively remove alcohol from the spent air and naphtha.

In order to demonstrate the efficacy of our invention in regenerating alcoholic alkali solution, a series of experiments were performed in which various alcoholic alkali solutions were used and in which various oxidation catalysts were used. In this series of experiments a 50 cc. sample of the solution to be tested, to which had been added 1% by weight of the catalyst to be tested and 1% by weight of sulfur in the form of normal butyl mercaptan, was placed in a 100 cc. graduated cylinder containing 75 cc. of No. 4 glass beads. A dip tube was placed in the cylinder so that the bottom thereof extended to the bottom of the cylinder and air was passed through the tube and bubbled through the solution for one hour at the rate of 0.03 cu. ft. per hour at a temperature of 75° F. At the end of the bubbling period the mixture was analyzed for disulfides in order to determine the amount of mercaptans that was oxidized. The various solutions used in these tests and the results obtained are listed in the following Table I.

from the table is that too high concentrations of alkali results in a lower rate of oxidation. (Compare Experiments 6 and 9 and also Experiments 4 and 10.)

It will also be observed from a comparison of Experiments 1 and 8 that an excessive amount of water in the solution reduces the rate of oxidation.

In order to demonstrate the effectiveness of my invention in sweetening hydrocarbon liquids, sour kerosene containing 0.011% by weight of mercaptan sulfur was treated in the following manner: 270 cc. of kerosene and 60 cc. of alcoholic alkali solution to be tested, containing 1% by weight of the oxidation catalyst to be tested (based on the alkali solution) were placed in a pint bottle. The bottle was placed in a shaking machine and was shaken at a fixed rate for fifteen minutes. The kerosene and treating solution were then transferred to a separatory funnel where the treating solution was drawn off

*Table I*

| No. of Expt. | Catalyst | Percent KOH | Solvent | Percent Oxidation |
|---|---|---|---|---|
| 1 | Hydroquinone | 10 | Formula 30 Alcohol | 33.2 |
| 2 | None | 10 | do | 11.1 |
| 3 | Hydroquinone | 10 | $H_2O$ | 6.7 |
| 4 | U. O. P. Inhibitor No. 1 | 10 | Formula 30 Alcohol | 62.3 |
| 5 | Hydroquinone | 10 | Absolute $C_2H_5OH$ | 48.9 |
| 6 | do | 10 | $CH_3OH$ | 29.7 |
| 7 | do | 13.9 | iso-$C_3H_7OH$ | 45.2 |
| 8 | do | 10 | 50% $H_2O$ / 50% Formula 30 Alcohol | 22.3 |
| 9 | do | 32.8 (saturated) | $CH_3OH$ | 2.2 |
| 10 | U. O. P. Inhibitor No. 1 | 28.5 | Formula 30 Alcohol | 28.1 |
| 11 | do | 32.8 (saturated) | Absolute $C_2H_5OH$ | 27.9 |
| 12 | Hydroquinone | 10 | 50% $CH_3OH$ / 50% $H_2O$ | 17.9 |
| 13 | None | 10% NAOH | Formula 30 Alcohol | 8.4 |

From the results tabulated in Table I, it will be seen that the rate of oxidation in which no catalyst was present (Experiments 2 and 13) resulted in a relatively low rate of oxidation. Likewise, the test on an aqueous alkali solution in which catalyst was present gave a low rate of oxidation (Experiment 3). However, when the same alcohol and the same catalyst were combined (Experiment 1) the rate of oxidation was almost twice as great as that which would have been expected from the cumulative results of Experiments 2 and 3.

Another interesting observation which appears and the kerosene was returned to the bottle with a fresh 60 cc. portion of treating solution containing 1% by weight of catalyst. The mixture was again shaken for thirty minutes being flushed with air every ten minutes. If the kerosene was still sour, the treating solution was drawn off as before and a fresh 60 cc. portion of treating solution, containing catalyst, was added and the mixture shaken for thirty minutes longer with air-flushing every ten minutes.

The data for the various treating solutions and the catalysts used and the results obtained are tabulated in Table II.

*Table II*

| No. | Alcohol | Alkali | Per Cent Alkali | Catalyst | Per Cent RSH-S | | |
|---|---|---|---|---|---|---|---|
| | | | | | After 15 min. shaking | After 45 min. shaking | After 75 min. shaking |
| 1 | $CH_3OH$ | KOH | 10 | Pyrogallol | 0.0032 | Slightly Dr. Positive | Dr. negative. Do. |
| 2 | do | do | 10 | do | 0.0029 | do | |
| 3 | do | do | 32.8 | do | 0.0035 | Dr. Positive | |
| 4 | do | do | 32.8 | U. O. P. Inhibitor #1 | 0.0019 | do | |
| 5 | do | do | 10 | do | 0.0012 | do | |
| 6 | do | do | 10 | I Tar Oil | Dr. negative | | |
| 7 | do | NaOH | 10 | U. O. P. Inhibitor #1 | Slightly Dr. positive. | do | |
| 8 | 75% $CH_3OH$ / 25% $H_2O$ | do | 10 | do | 0.0021 | do | |
| 9 | 90% $CH_3OH$ / 10% $H_2O$ | do | 10 | I Tar Oil | 0.0020 | do | |
| 10 | 75% $CH_3OH$ / 25% $H_2O$ | do | 10 | do | 0.0020 | do | |
| 11 | 75% $CH_3OH$ / 25% $H_2O$ | KOH | 10 | U. O. P. Inhibitor #1 | 0.0012 | do | |
| 12 | $C_2H_5OH$ | do | 10 | Pyrogallol | 0.0031 | Slightly Dr. Positive | |
| 13 | Formula 30 alcohol | do | 28.5 | U. O. P. Inhibitor #1 | 0.0019 | Dr. negative | |
| 14 | do | do | 10 | do | 0.0012 | do | |
| 15 | do | do | 10 | Pyrogallol | 0.0013 | | Dr. negative. 0.0017 |
| 16 | do | do | 10 | None | 0.0045 | 0.0020 | |

From an examination of Table II, it is evident that I Tar Oil is superior to U. O. P. Inhibitor No. 1 and that U. O. P. Inhibitor No. 1 is superior to pyrogallol as an oxidation catalyst in the sweetening of kerosene in the presence of alcoholic alkali solution. It is also apparent that potassium hydroxide solutions are more effective in the sweetening solution than are sodium hydroxide solutions. The table also demonstrates that too high concentration of alkali has a deleterious effect on the rate of sweetening. By referring to Experiment No. 16 it will be seen that in the absence of an oxidation catalyst the kerosene could not be sweetened even after 75 minutes of treatment.

It is apparent, therefore, that by carrying out the sweetening operation by means of air or other oxygen-containing gas in the presence of alcoholic alkali solution containing in solution a small amount of phenolic oxidation catalyst, sweetening of hydrocarbon liquids can be rapidly and effectively carried out. Regeneration of alcoholic alkali solutions can also be effectively carried out by means of air or other oxygen-containing gas if the regeneration is carried out in the presence of a small amount of a phenolic catalyst dissolved in the alcoholic alkali solution. The rate at which regeneration or sweetening can be effected is far in excess of the rate which would be expected from the cumulative effect of air regeneration of alcoholic alkali solutions in the absence of phenolic oxidation catalyst and of aqueous alkali solutions in the presence of phenolic oxidation catalysts.

It is claimed:

1. The method of sweetening hydrocarbon distillate containing mercaptans comprising, intimately contacting said distillate with a solution of alkali metal hydroxide in monohydric alcohol from the group consisting of methyl and ethyl alcohols, which solution contains less than 25 per cent by weight of water, between 10 and 25 per cent by weight of alkali metal hydroxide from the group consisting of sodium and potassium hydroxide, and about 0.1 to 3 per cent by weight of a phenolic substance capable of being oxidized to a quinone, while bubbling sufficient air through said distillate to effect sweetening thereof.

2. Method in accordance with claim 1 in which the phenolic substance is a high boiling fraction of hard wood tar.

3. Method in accordance with claim 1 in which the phenolic substance is settled hard wood tar.

DONALD C. BOND.

REFERENCES CITED

The following references are of record in the file of this patent:

UNITED STATES PATENTS

| Number | Name | Date |
|---|---|---|
| 2,015,038 | Pevere | Sept. 17, 1935 |
| 2,152,721 | Yabroff | Apr. 4, 1939 |
| 2,181,036 | Wilson | Nov. 21, 1939 |
| 2,181,037 | Wilson | Nov. 21, 1939 |
| 2,315,530 | Loyd | Apr. 6, 1943 |
| 2,335,347 | McNamara | Nov. 30, 1943 |
| 2,366,104 | Happel | Dec. 26, 1944 |
| 2,369,771 | Bond | Feb. 20, 1945 |
| 2,390,296 | Gilbert | Dec. 4, 1945 |
| 2,411,105 | Nixon et al. | Nov. 12, 1946 |
| 2,413,945 | Bolt | Jan. 7, 1947 |